United States Patent
Porsch

(10) Patent No.: US 9,358,993 B2
(45) Date of Patent: Jun. 7, 2016

(54) METHOD FOR OPTIMIZED OPERATION OF AN ELECTRICALLY DRIVEN RAIL VEHICLE ON A PREDEFINED ROUTE

(71) Applicant: SIEMENS AKTIENGESELLSCHAFT, Munich (DE)

(72) Inventor: Roland Porsch, Speichersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/365,691

(22) PCT Filed: Dec. 14, 2012

(86) PCT No.: PCT/EP2012/075520
§ 371 (c)(1),
(2) Date: Jun. 16, 2014

(87) PCT Pub. No.: WO2013/087832
PCT Pub. Date: Jun. 20, 2013

(65) Prior Publication Data
US 2014/0365047 A1    Dec. 11, 2014

(30) Foreign Application Priority Data

Dec. 14, 2011  (DE) .......................... 10 2011 088 544
Dec. 16, 2011  (DE) .......................... 10 2011 121 162

(51) Int. Cl.
*B61L 27/00*    (2006.01)
*B60L 1/00*    (2006.01)
(Continued)

(52) U.S. Cl.
CPC ............. *B61L 27/0027* (2013.01); *B60L 1/003* (2013.01); *B60L 7/18* (2013.01); *B60L 9/00* (2013.01); *B61L 3/006* (2013.01); *B60L 2200/26* (2013.01); *B60L 2240/34* (2013.01); *B60L 2240/80* (2013.01); *B60L 2260/54* (2013.01)

(58) Field of Classification Search
CPC ............. B60L 1/003; B60L 7/18; B60L 9/00; B60L 2240/34; B60L 2240/80; B60L 2260/54; B60L 2200/26; B61L 3/006
USPC ............. 701/19, 1, 31.4; 105/26.2, 463.1, 35, 105/50, 26.05, 49; 180/65.245, 65.285, 180/65.29, 65.31; 104/289
See application file for complete search history.

(56) References Cited

U.S. PATENT DOCUMENTS 6,141,607 A    10/2000  Hergert-Mückusch et al.
7,822,491 B2   10/2010  Howlett et al.
(Continued)

FOREIGN PATENT DOCUMENTS

CN    101360641 A    2/2009
CN    101554879 A    10/2009
(Continued)

OTHER PUBLICATIONS

Linder, Ulrich: "Optimierung von Fahrweisen im spurgeführten Verkehr und deren Umsetzung" [Optimization of driving styles in track-bound traffic and implementation thereof], Berlin, Apr. 26, 2004 (in particular p. iii and pp. 47 to 53), Apr. 26, 2014—Statement of Relevance.
(Continued)

*Primary Examiner* — Marthe Marc-Coleman
(74) *Attorney, Agent, or Firm* — Laurence Greenberg; Werner Stemer; Ralph Locher

(57) ABSTRACT

A method optimizes operation of an electrically driven rail vehicle on a predefined route. In order to optimize the known method even further, the costs of the electrical energy which is fed into the route and/or the environmental loading are sensed during the generation of the electrical energy which is fed into the route. The method of locomotion of the rail vehicle on the route is set taking into account the level of the costs of the electrical energy and/or the environmental loading in the generation of the electrical energy for the route.

6 Claims, 1 Drawing Sheet

(51) Int. Cl.
    *B60L 9/00*     (2006.01)
    *B61L 3/00*     (2006.01)
    *B60L 7/18*     (2006.01)

(56) References Cited

U.S. PATENT DOCUMENTS

| | | | |
|---|---|---|---|
| 2003/0233959 A1* | 12/2003 | Kumar | 105/26.05 |
| 2007/0272116 A1* | 11/2007 | Bartley et al. | 105/35 |
| 2008/0033605 A1 | 2/2008 | Daum et al. | |
| 2008/0125924 A1 | 5/2008 | Daum et al. | |
| 2009/0234521 A1 | 9/2009 | Kumar et al. | |
| 2009/0254233 A1 | 10/2009 | Noffsinger et al. | |

FOREIGN PATENT DOCUMENTS

| | | |
|---|---|---|
| CN | 101941387 A | 1/2011 |
| CN | 102248956 A | 11/2011 |
| DE | 102009041409 A1 | 3/2011 |
| RU | 2382711 C1 | 2/2010 |
| WO | 9709217 A1 | 3/1997 |
| WO | 03097424 A1 | 11/2003 |
| WO | 2011032661 A2 | 3/2011 |

OTHER PUBLICATIONS

Linder et al; "Strategien und Hindernisse bei der Optimierung von Fahrweisen"; Elektrische Bahnen, Oldenborg, Industrieverlag, München; vol. 103; No. 3; pp. 109-115; ISSN: 0013-5437; XP 001539859; 2004; DE; Jan. 1, 2004—English abstract.

Würtenberger Felix; "Event Evaluation of Energy Efficiency Technologies for Rolling Stock and Train Operation of Railways"; Institute for Futures Studies and Technology Assessment, Apr. 11, 2014 downloaded from Internet: URL: http://www.uic.org/download.php/environnement/energy_EVENT.pdf; pp. 1-120; XP002723267; 2003; Mar. 1, 2003.

* cited by examiner

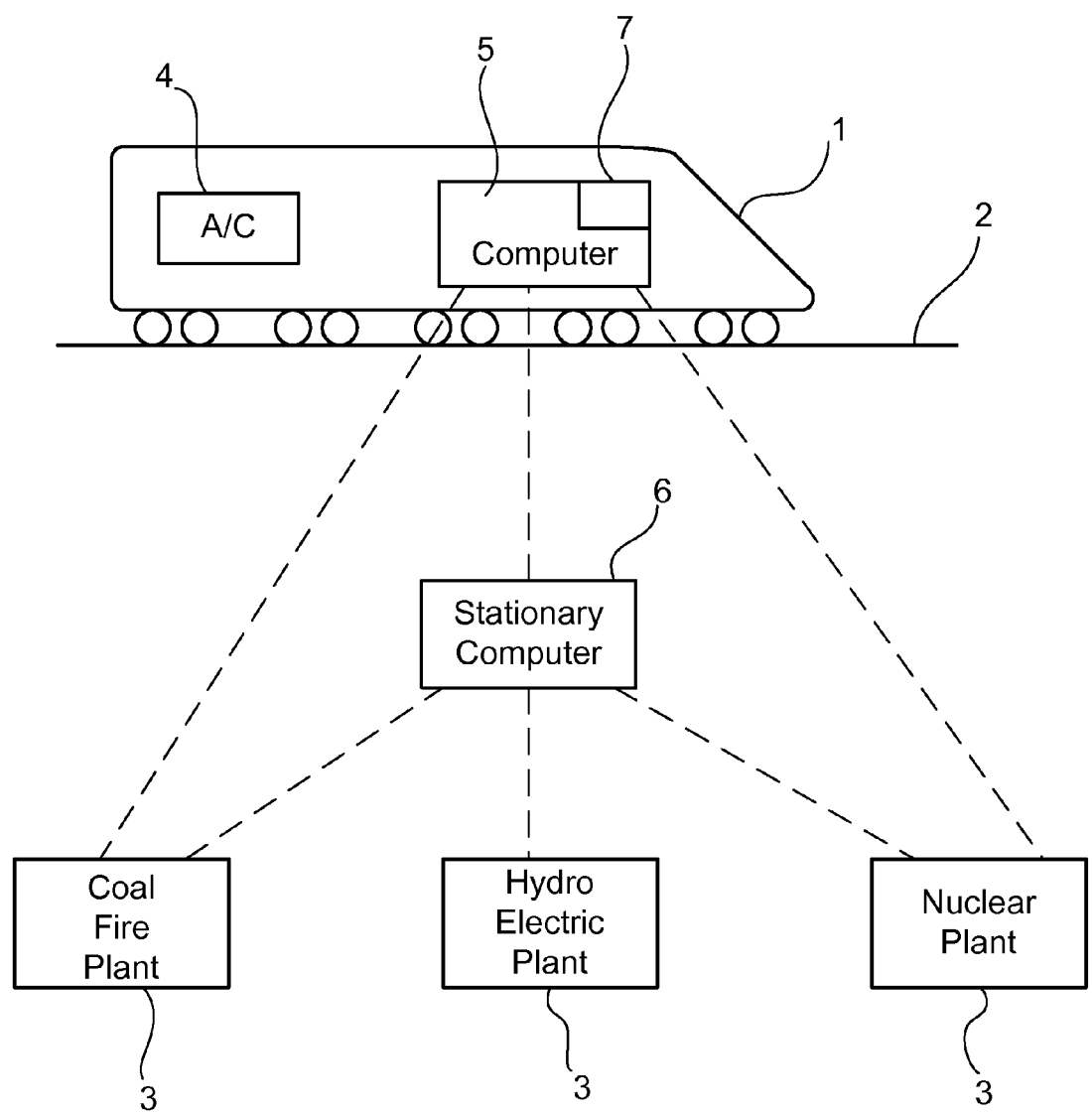

METHOD FOR OPTIMIZED OPERATION OF AN ELECTRICALLY DRIVEN RAIL VEHICLE ON A PREDEFINED ROUTE

BACKGROUND OF THE INVENTION

Field of the Invention

The invention relates to a method for optimized operation of an electrically driven rail vehicle on a predefined route.

Such a method is known, for example, from the dissertation "Optimierung von Fahrweisen im spurgeführten Verkehr and deren Umsetzung" [Optimization of driving styles in track-bound traffic and implementation thereof], Berlin 2004 by U. Linder (in particular page iii and pages 47 to 53). According thereto, an optimal energy-saving driving style can be achieved by solving a mathematical optimization problem, wherein particular boundary conditions need to be taken into account. The boundary conditions include the topography of the route, the maximum speed on the route, the vehicle data, the route occupancy and the timetable. The energy-saving driving style is determined online, for example, by means of an on-board computer of the rail vehicle using an algorithm.

BRIEF SUMMARY OF THE INVENTION

The invention is based on the object of optimizing the known method even further.

In order to achieve this object, in a method of the type stated at the outset, the costs of the electrical energy fed into the route and/or the environmental pollution when producing the electrical energy fed into the route are acquired according to the invention and the driving style of the rail vehicle on the route is set taking into account the level of the costs of the electrical energy and/or the environmental pollution when producing the electrical energy for the route.

BRIEF DESCRIPTION OF THE DRAWING

The single FIGURE of the drawing is an illustration of a rail vehicle and its associated power sources according to the invention.

DESCRIPTION OF THE INVENTION

The invention advantageously makes it possible to optimize the driving style of a rail vehicle 1 with respect to the energy costs for traveling on the respectively predefined route 2 and to concomitantly take said driving style into account when optimizing the operating costs. This is because, according to experience, the energy costs on the different routes of a rail network are not the same everywhere but rather are dependent on which energy supplier 3 supplies the respective route 2 with electrical energy. This results in the possibility of traveling relatively quickly on routes which are inexpensive in terms of energy with the creation of a time reserve and of using the time reserve obtained on routes which are expensive in terms of energy by traveling in a relatively slow and therefore relatively cost-effective manner whilst complying with the timetable.

The method according to the invention is also advantageous insofar as, in addition or as an alternative to optimizing the energy costs, it also makes it possible to travel in an environmentally friendly manner by taking into account the environmental pollution which is caused when producing the electrical energy fed into the respective route. This is because it is known what environmental pollution is caused by the energy supplier supplying the respective route. The power consumption can be reduced here by traveling in a relatively slow manner on a route which is supplied with electrical energy produced in a very environmentally harmful manner; it is then possible to travel more quickly with a higher energy consumption on a route which is fed with electrical energy produced from hydroelectric power, for example, in order to compensate for the time loss and to comply with the timetable.

In one advantageous refinement of the method according to the invention, the costs of the electrical energy are acquired taking into account time-dependent changes in the energy costs. This is because the energy costs may be different daily, monthly or seasonally.

In order to practically carry out the method according to the invention, it is advantageous if the costs and/or the environmental pollution are stored, as optimization goals with weighting, in addition to other optimization goals, in a data processing device as a vector, and a choice is made as to which optimization goal is intended to be primarily taken into account.

It also appears to be advantageous if the energy consumption for an air-conditioning system 4 is stored as another optimization goal.

In this case, the rail vehicle's own computer unit 5 can be advantageously used as the data processing device.

However, it may also be advantageous to use a stationary computer 6 with an information transmission path to the rail vehicle as the data processing device.

A data processing device 5, 6, the memory 7 of which stores a vector, is used when carrying out the method according to the invention. Different optimization goals and their weighting are stored in this vector. A stored optimization goal may be, in a known manner, a minimal energy consumption. Another optimization goal is minimal energy costs and minimal environmental pollution, for example minimal $CO_2$ emission. In addition, optimization goals relating to passenger requirements may also possibly be stored.

During the journey, the optimization goal which is intended to be optimized is selected from the vector. In this case, the respective optimization goal can be selected by an authorized operator or by a command from a stationary computer using the rail vehicle's own computer unit.

The optimization goals of minimal energy costs and minimal environmental pollution are dependent on the level of the costs of the electrical energy fed into the respectively traveled route and on the environmental pollution caused when producing this electrical energy. This is generally known. If the rail vehicle travels through a route with low energy costs, in order to achieve low energy costs, travel is effected at a comparatively high speed with the acceptance of a relatively high energy consumption if routes to be subsequently traveled cause high energy costs. It is then possible to travel in a relatively slow manner with relatively little energy consumption on the routes with high energy costs. This makes it possible to build up a time reserve on the route traveled first, which time reserve is then used on the routes which are expensive in terms of energy; it is nevertheless possible to comply with the timetable and the energy costs are optimally low.

If the environmental pollution is intended to be kept as low as possible as an optimization goal, travel is effected in a comparatively slow manner with little energy consumption with the acceptance of a time deficit on a route which is fed with electrical energy produced in an environmentally harmful manner, for example from lignite. Routes which are subsequently traveled and are fed with electrical energy produced in an environmentally friendly manner, for example from hydroelectric power, are traveled through relatively quickly, as a result of which the time deficit is made up for and the timetable is complied with. Overall, this results in optimally environmentally friendly operation of an electrical rail vehicle.

Low energy costs and environmentally friendly travel will be able to be achieved in future, in particular, in European, cross-border rail traffic because electrical energy is fed into the routes in the different countries from very different energy supply networks. In order to achieve the optimization goals described above, it goes without saying that there is a need for route data which need to be taken into account as parameters such as gradient, downhill gradient, curve radii, tunnel resistances, etc. In order to optimize the energy costs, the costs in currency units are taken into account and, in order to optimize the environmental pollution, the composition of the electrical energy supplied is taken into account according to its respective proportion in terms of the $CO_2$ emission when producing these proportions.

The invention claimed is:

1. A method for optimized operation of an electrically driven rail vehicle on a rail network having a set of routes, which comprises the steps of:
   providing a data processor;
   operating the electrically driven rail vehicle on the rail network, the routes of the rail network being respectively fed with electrical energy from an energy supplier external to the electrically driven rail vehicle and energy costs and environment pollution on the routes of the rail network being dependent on the energy supplier supplying a respective route with the electrical energy, wherein the operating step comprises successively operating the electrically driven rail vehicle on different routes of the set of routes according to the following further steps of:
   acquiring route energy data of each of the different routes by the data processor, the route energy data being selected from the group consisting of costs of the electrical energy fed into the respective route and amount and type of the environmental pollution created when producing the electrical energy fed into the respective route;
   setting a driving style for each of the different routes via the data processor for operating the electrically driven rail vehicle on the respective route according to at least an optimization goal selected from the group consisting of minimal energy costs and minimal environmental pollution, wherein the driving style including at least a travel speed of the electrically driven rail vehicle and is set by using the route energy data of the respective route; and
   operating the electrically driven rail vehicle on the different routes according to a respective set driving style.

2. The method according to claim 1, which further comprises acquiring the costs of the electrical energy taking into account time-dependent changes.

3. The method according to claim 1, which further comprises storing at least one of the costs or the amount and type of environmental pollution, as optimization goals with weighting, in addition to other optimization goals, in the data processor as a vector, and a choice is made as to which optimization goal is intended to be taken into account.

4. The method according to claim 3, which further comprises storing an amount of energy consumption for an air-conditioning system as another optimization goal.

5. The method according to claim 3, which further comprises using a computer unit of the electrically driven rail vehicle as the data processor.

6. The method according to claim 3, which further comprises using a stationary computer with an information transmission path to the electrically driven rail vehicle as the data processor.

* * * * *